United States Patent [19]

Mentzer et al.

[11] 4,333,189
[45] Jun. 8, 1982

[54] AUTOMATIC BEE FEEDER

[76] Inventors: James R. Mentzer, Box 276, R.D. 2, New Holland, Pa. 17557; Hugh J. Lofting, Box 230, R.D. 2, West Grove, Pa. 19390

[21] Appl. No.: 197,539

[22] Filed: Oct. 16, 1980

[51] Int. Cl.³ ............................................. A01K 53/00
[52] U.S. Cl. ................................................................ 6/5
[58] Field of Search ................................. 6/5; 119/78

[56] References Cited

U.S. PATENT DOCUMENTS

| | | | |
|---|---|---|---|
| 416,935 | 12/1889 | Merriman | 6/5 |
| 905,706 | 12/1908 | Johnson | 6/5 |
| 1,406,568 | 2/1922 | Lubbey | 6/5 |
| 2,193,741 | 3/1940 | Roberts, Jr. | 6/5 |
| 2,522,511 | 9/1950 | Hageman | 6/5 X |
| 2,904,004 | 9/1959 | Bruns et al. | 119/78 X |
| 3,835,487 | 9/1974 | Grigg | 6/5 |
| 3,842,457 | 10/1974 | Johnson | 6/5 |
| 4,064,895 | 12/1977 | Borgen et al. | 119/78 X |

FOREIGN PATENT DOCUMENTS

| | | | |
|---|---|---|---|
| 1289352 | 2/1969 | Fed. Rep. of Germany | 6/5 |
| 488988 | 7/1938 | United Kingdom | 6/5 |

Primary Examiner—Hugh R. Chamblee
Attorney, Agent, or Firm—Martin Fruitman

[57] ABSTRACT

A bulk feeding system for bees which feeds multiple hives from a single reservoir through a piped distribution system. Each hive is fed from a single enclosed box-like feeder which replaces part of the comb foundation and is float controlled. A valve operated by the float assures a supply of food or water keyed to actual consumption. The float and valve are completely isolated from contact with the bees by the use of a separate feeding chamber to prevent interference with the valve action by the bees.

16 Claims, 4 Drawing Figures

AUTOMATIC BEE FEEDER

SUMMARY OF THE INVENTION

This invention refers generally to bee culture and more specifically to bee feeders.

A number of bee feeders for mounting within a bee hive already exist in the bee culture patent art. These available feeders have tended generally to center on two types of construction. One type has bee feeders external to the hive, such as an inverted bottle mounted on the hive and piped into the hive where it fills a trough. Such a feeder was shown in U.S. Pat. No. 2,193,741.

A second type feeder, more common in recent art, is the type constructed to resemble a hive frame. This feeder is essentially a batch type unit which can easily be removed for refilling. U.S. Pat. Nos. 3,842,457 and 3,835,487 show typical embodiments of this type of bee feeder.

All types of prior art feeders have, however, approached the problem by feeding a single hive at a time and regulating the amount of feeding manually, either by valving a specified flow rate or by batch filling the feed to a quantity intended to anticipate the bees needs.

The disadvantages of such systems are clear. The feeding depends on anticipation of the hive needs, rather than on the actual requirements of the bees. Moreover, the human labor in such systems is enormous. The requirement of refilling the feeder of each hive on a regular and frequent basis means that the number of hives a beekeeper maintains is strictly limited by the labor he can furnish to maintain the feeding system.

The apparent solution of feeding bees from a common source is made impossible by the bees themselves and their strong feeding instincts. While a common watering trough was patented by Lubben in U.S. Pat. No. 1,406,568, the adaption of such a system to feeding syrups is impossible because the bees from many hives would literally declare war on each other in an attempt to keep the food source for themselves, and all the affected hives would eventually be destroyed.

What is needed in the bee culture industry is a bulk loading, multiple hive, automatic feeding system in which the bees themselves control the amount of food available.

A major requirement of such a system is that the source for each hive must be within its acknowledged territory, within the hive.

A further requirement is that the feeding station must match the existing hardware used in the industry, that is, that it fit easily into the space occupied by a standard hive frame and, more desirably, into a variety of frame sizes. This requires the feeding system to have a width of less than $1\frac{1}{4}$ inches.

A still further objective is that the feed system be adaptable to various feed solutions and, preferably, also to water.

Another objective of a bulk bee feeding system is that the access of individual bees be limited so that the bees do not drown in the liquid.

Finally, it is absolutely necessary that the operation, size and shape of the feeding station be such that the bees do not disable the feeder by building comb structure around it.

These objectives are all fulfilled by the present invention which encompasses an enclosed, self-contained, float controlled feeding station within each hive. In the system described, a single high quantity reservoir contains bee feeding solution, water, pharmaceuticals, honey or any other liquid which may be desirable to feed to bees. The reservoir is connected to each of several hives by piping suitable for the material being fed, and valves are used within the piping system to make maintenance of the system easier by permitting isolation of the various feeding stations or cutoff of the total food supply.

Within each hive, a valve controlled feeding station, slightly narrower than the width of a single comb, is placed onto a frame from which a portion of the comb foundation has been removed. Flexible tubing is used to connect to the feeding station so that the entire feeding frame can be easily slipped into the hive for easy installation and manipulation.

The feeding station is specifically designed to be compatible with the hive, the colony dynamics and the bees feeding habits. The width of the preferred embodiment is, for instance, selected to match the width of the typical drawn and capped worker bee comb which is between 15/16 and $1\frac{1}{4}$ inch wide. The width selected is also slightly less than the maximum length of comb and does not interfere with adjacent combs.

The feeding station is essentially a rectangular enclosed chamber with the width as chosen above, with an open-topped extension trough at one end. The open trough is interconnected with the enclosed chamber at a point close to their bottoms, so that liquid within the enclosed chamber will flow into the bottom of the open trough and rise to the level of liquid in the enclosed chamber.

The open trough contains a sloping serrated "staircase" which reaches to the very bottom of the trough and textured walls, thus permitting bees to climb out of the feed solution, regardless of the depth of the feed solution.

The quantity of feed solution in the feeding station is controlled by a float controlled valve. The float itself is constructed of closed cell foam, approximates the elongated, narrow chamber itself in shape and pivots on an axis near one end. The float pivot can be adjustable to permit adjustment of the feed solution depth. A simple valve acting upon the feed entry pipe acts to close off the flow of feed solution when the float is raised by a sufficient quantity of liquid in the chamber.

The size of the feeding trough is such that a limited number of bees have access to it at any one time, but one of the advantages of the construction and location of the feeding station is that bees can cluster around it and, in the process, warm the feed solution.

The chief advantage of the feeding system is, however, its continuous regulation of access to food, water or medication. No disruption of the hives is necessary to change diets. All normal loading is at the single reservoir which feeds all hives and there is no need to even approach the individual hives, let alone partially dismantle them, to load the feeding station.

DETAILED DESCRIPTION OF THE INVENTION

Figure 1:
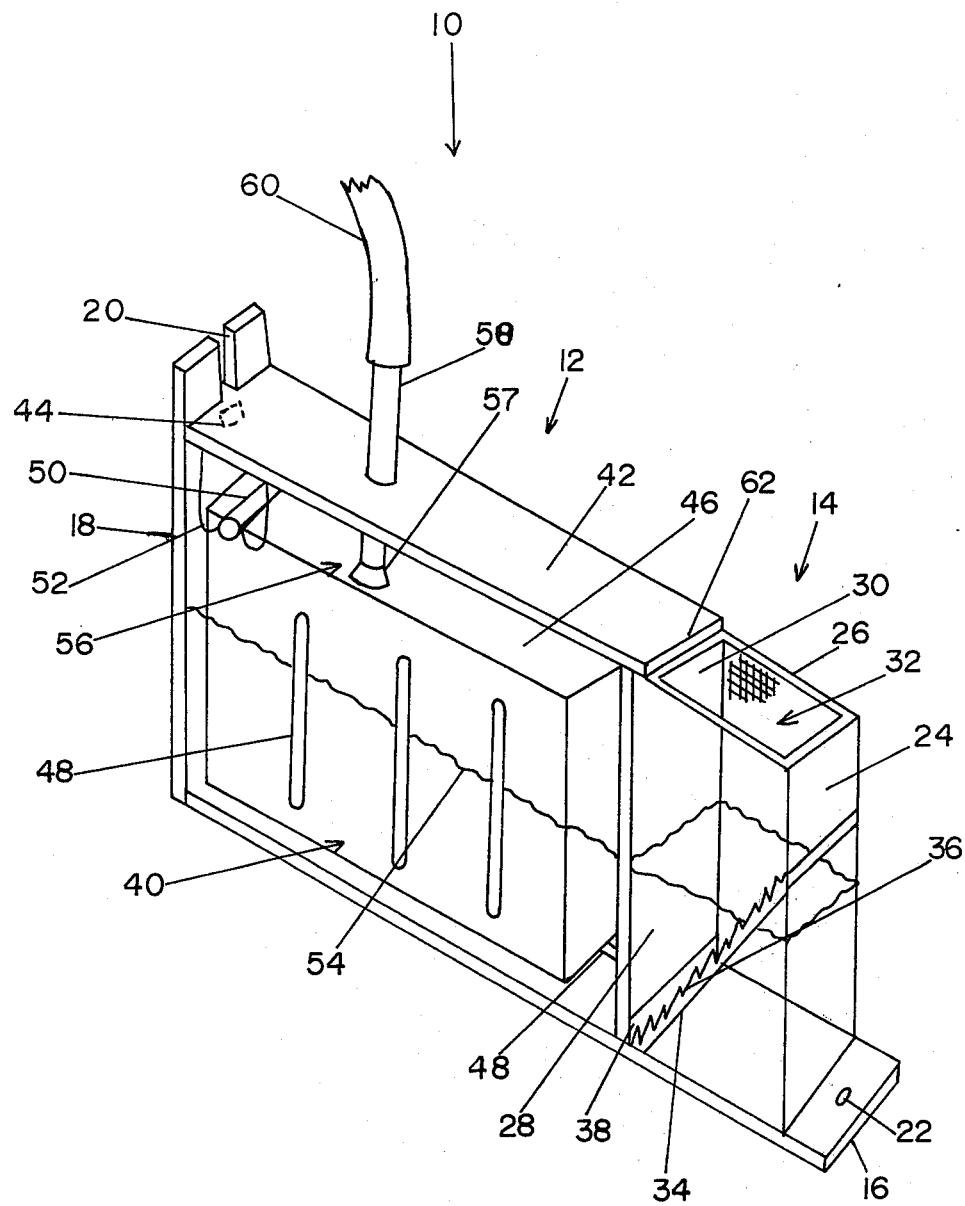
FIG. 1 is a perspective view of the float controlled feeding station of the preferred embodiment, with the interior visible due to construction from transparent material.

FIG. 1 is a perspective view of the preferred embodiment of novel bee feeding station 10 of the invention in which the major structural material is transparent plastic to permit ease of inspection.

Figure 4:
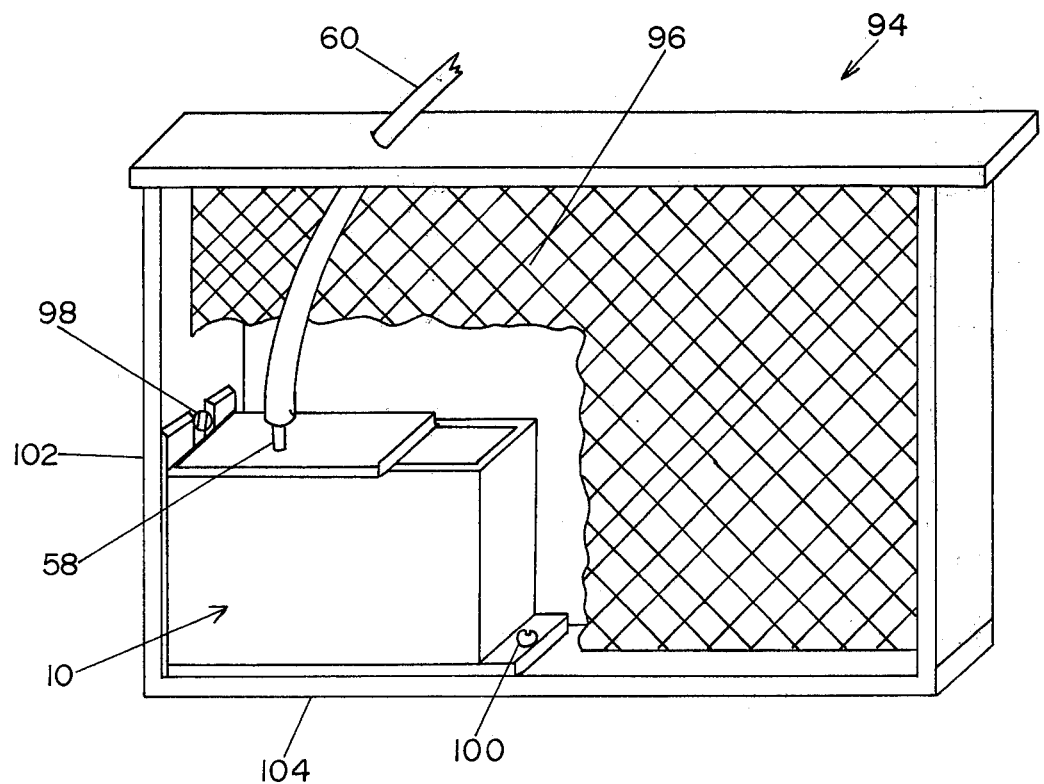
FIG. 4 is a perspective view showing the feeding station located within a typical hive frame.

Feeding station 10 is constructed in two distinct sections, float chamber 12 and feeding trough 14, both of which are constructed upon base 16 and side support 18. Side support 18 is furnished with slot 20 and base 16 contains through hole 22 so that feeding station 10 can be easily attached to a conventional hive frame as shown in FIG. 4.

Feeding trough 14 is constructed upon base 16 with high straight sides 24, 26, 28 and divider 30. Open top 32 permits access for the bees, but is small enough to limit the quantity of bees to a reasonable number. Bee ladder 34 is a non-vertical surface constructed at an angle between horizontal and vertical and hung from high on side 24 angling downward to base 16 near divider 30. Serrations 36 are cut into the top surface of bee ladder 34 and sides 26 and 28 are textured to furnish the bees with proper traction on the surface when it is wet by syrup near the top level of the liquid. An opening 38 is constructed in divider 30, just above base 16, to permit easy flow of feed solution into feeding trough 14 from float chamber 12.

Float chamber 12 is also constructed with straight sides 40 rising from base 16 between side support 18 and divider 30. Float chamber 12, however, is closed by top 42, except for air slit 44 which is designed to permit air to escape the chamber as liquid enters and fills it. Air slit 44 is kept small and shielded to prevent bees from getting to the feed solution at that point by locating it on the back side of side support 18.

Float 46 is sized to approximate the inside dimensions of float chamber 12, but with enough clearance to move freely in the vertical direction. Ridges 48 on the inside of side 40 and the matching opposite side prevent float 46 from hanging up due to caking of syrup on the large flat adjacent surfaces of float 46 and side 40.

Pivot rod 50, attached to float 46 and projecting beyond both large sides of float 46, is dimensioned to extend from one side of chamber 12 to the other and rest in pivot grooves 52 which are cut into the inside surface of side 40. Pivot rod 50 is located near the upper corner of float 46 so that float 46 tilts downward upon pivot rod 50 when liquid level 54 lowers.

It is this pivoting motion which operates valve 56, closing off feed pipe 58 connected to flexible tubing 60. The valve action is described in more detail in FIG. 3.

For adjusting the pivot point to raise or lower the liquid level, or for any other desired maintenance, it is only necessary to lift top 42, which is a press fit between the vertical sides, off of the float chamber. Lip 62 which extends slightly over into opening 32 of feeding trough 14 is used a convenient lift point when removing top 42, while the other end of top 42 shields air vent 44 from access by the bees.

Figure 2:
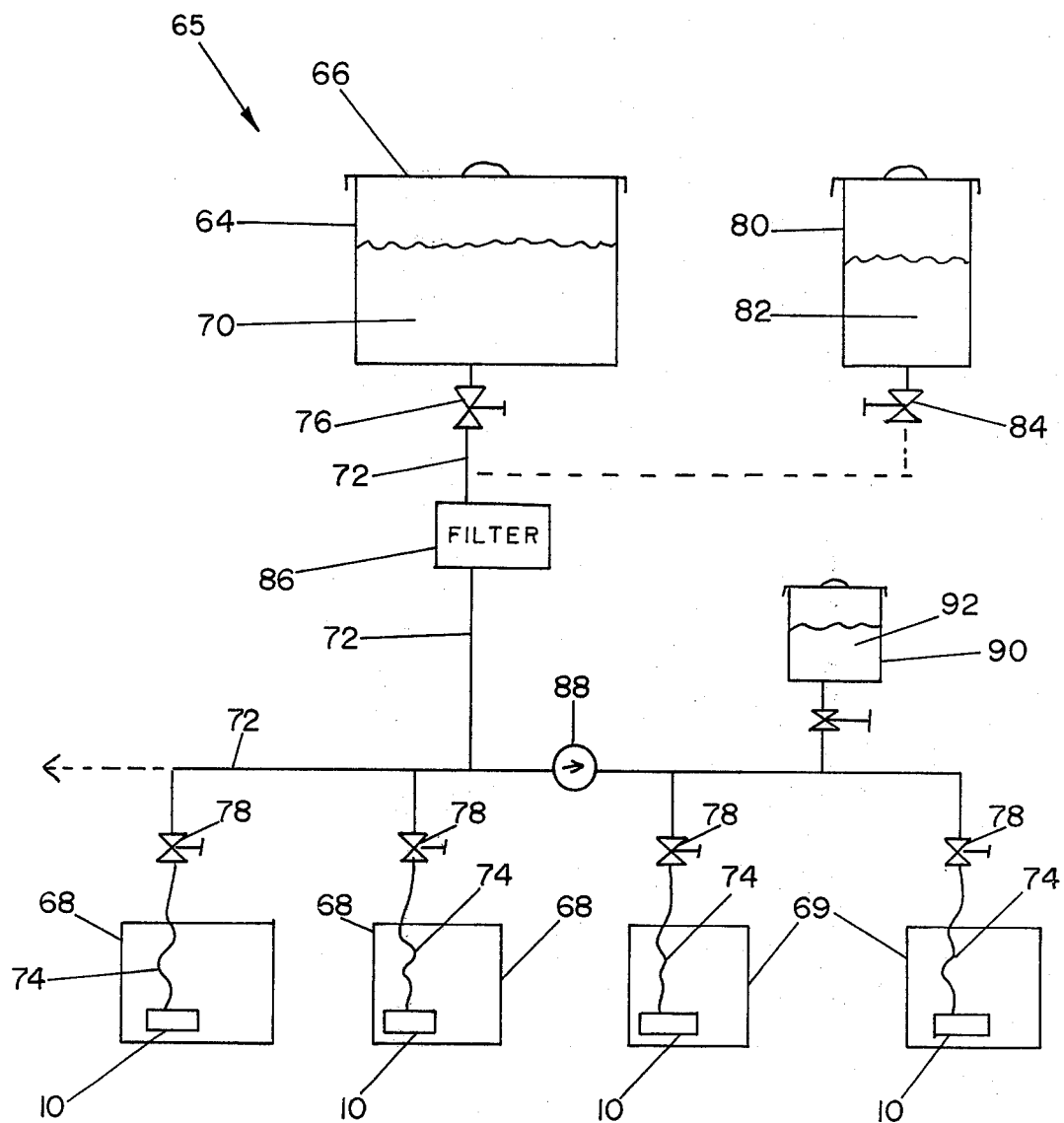
FIG. 2 is a schematic diagram of the preferred embodiment of the feeding and distribution system of the invention.

FIG. 2 is a schematic diagram of a typical bulk feeding system 65 of the invention in which reservoir 64, covered by top 66, is used to supply liquid to several hives 68 and 69. Within each hive 68 and 69 is placed a feeding station 10 constructed as described in reference to FIG. 1.

Reservoir 64, filled with feeding solution 70, is connected by piping 72 to each hive 68 and 69, where flexible tubing 74 is used to make the final connection to feeding station 10. Flexible tubing 74 permits easy removal of the single frame containing feeding station 10 from hives 68 and 69 with minimum disruption of the colony.

It is advantageous to place main valve 76 in the system near reservoir 64 and hive valves 78 near each hive 68 and 69 to permit isolation of each section of the system for changing the feed solution or moving a hive.

Using the present invention, it is possible to add a second auxiliary reservoir 80 with different feed solution 82 and auxiliary valve 84 to permit easy switchover from one feed solution to another.

Filter 86 can also be added along with other auxiliary treatment devices to treat the feed solution before distribution to the hives. A unidirectional flow valve 88 can be used with auxiliary reservoir 90 to feed only specific hives 69 a special additive 92.

Figure 3:
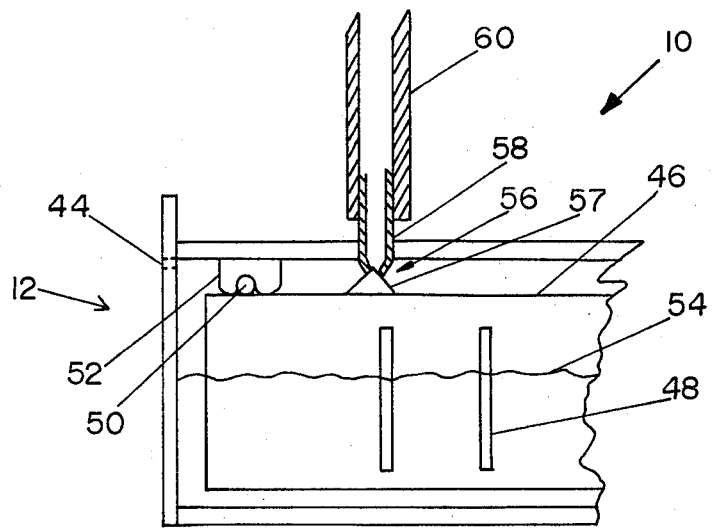
FIG. 3 is a partial sectional view of the preferred embodiment showing the float controlled valve mechanism.

FIG. 3 is a partial cross sectional view of feeding station 10 which shows the action of valve 56 and float 46 to control the feed solution level 54. Float 46, constructed of closed cell floatation foam, or other suitable material, pivots upon pivot rod 50, which projects beyond both sides of float 46 near one corner of float 46. Pivot rod 50 rests on one of several pivot grooves 52 cut into the inside surface of float chamber 12. As the pivot groove into which pivot rod 50 rests is changed, the liquid level 54 at which float 46 is raised also changes, thus changing the depth of feed solution available to the bees. This change of depth actually changes the surface area available for feeding due to the angle of bee ladder 34 (in FIG. 1).

As float 46 rises due to its buoyancy, valve 56 cuts off liquid flow from feed pipe 58, which is connected to flexible tubing 60. Valve 56 is a simply constructed valve, in which cone shaped stopper 57 is attached to float 46. As float 46 rises, the upper surface of stopper 57 presses into the opening of feed pipe 58, stopping the liquid flow. As float 46 lowers, stopper 57 is pulled away from feed pipe 58 by float 46, permitting liquid to flow and yielding a positive opening action which prevents dried feed solution from causing stopper 57 to stick to feed pipe 58. The proper alignment of stopper 57 with the opening of feed pipe 58 is assured by the conical shape and flexibility of stopper 57.

As liquid fills float chamber 12, air slit 44 permits air to escape from float chamber 12, thus preventing air pressure build up which might affect liquid flow. Ridges 48 are attached to or formed on the inside surfaces of float chamber 12 to prevent float 46 from sticking to the sides of chamber 12 due to such factors as surface tension or dried feed solution.

FIG. 4 shows the preferred location of feeding station 10 within typical hive frame 94. Since the width of feeding station 10 is less than that of frame 94, all that is required is that sufficient comb foundation 96 be cut away to permit placement of feeding station 10 in a lower corner of frame 94. Feeding station 10 is then attached by use of screws 98 and 100 or other suitable means. Since frame 94 is typically constructed with sides 102 and 104 of wood, predrilling of screw holes is rarely needed. With flexible tubing 60 attached to feed pipe 58, it is then a simple matter to insert frame 94 into or remove it from a hive.

The use of the present invention is not limited to bee feeding solution only. It is also most satisfactory for use with water, drugs, honey or liquid protein. It is particularly beneficial for supplying water to hives when the usual water sources are contaminated, such as during spraying of pesticides, or during severe hot weather or drought.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the feeding station can be used without the distribution system by attachment of a single small reservoir, such as a bottle, directly to it, and several feeding stations could be placed in one hive or even in one frame.

What is claimed as new and desired to be secured by Letters Patent of the United States is:

1. A bulk feeding and distribution system for bees comprising:
   a reservoir;
   a liquid distribution means connected to the reservoir; and
   at least two float controlled feeding stations, each attached to a removable hive frame and enclosed within separate hives, connected to the liquid distribution means.

2. A bulk feeding and distribution system for bees as in claim 1 wherein the float controlled feeding station comprises a liquid control valve means which prevents liquid flow from the liquid distribution means into the feeding station when the quantity of liquid within the feeding station is greater than a specific amount.

3. A bulk feeding and distribution system for bees as in claim 1 wherein the distribution system includes a valve for cutting off liquid flow from the reservoir.

4. A bulk feeding and distribution system for bees as in claim 1 wherein the float controlled feeding station comprises:
   a first chamber, enclosed to prevent access to its interior by bees, containing a float means acting upon a valve means which prevents liquid from flowing into the first chamber when the depth of liquid in the first chamber is greater than a specific level;
   a second chamber with access means for bees, interconnected with the first chamber at a point below the level of liquid at which the valve means prevents liquid flow; and
   connecting means connecting the first chamber to the liquid distribution means.

5. A float controlled feeding station for bees comprising:
   a structure, attached to a replaceable hive frame and fitted within the outline of the frame, comprising:
   a first chamber, enclosed to prevent access to its interior by bees, containing a float means acting upon a valve means which prevents liquid from flowing into the first chamber when the depth of liquid in the first chamber is greater than a specific level;
   a second chamber with access means for bees, interconnected with the first chamber at a point below the level of liquid at which the valve means prevents liquid flow; and
   connecting means connecting the first chamber to a liquid supply means.

6. A float controlled feeding station for bees as in claim 5 further comprising an air vent means within the first chamber to prevent air pressure build up.

7. A float controlled feeding station for bees as in claim 5 further comprising a non-vertical surface within the second chamber, to furnish a location upon which feeding bees can alight.

8. A float controlled feeding station for bees as in claim 7 wherein the top surface of the non-vertical surface is a serrated surface, oriented at an angle to the vertical, which is partially covered by the liquid in the second chamber when the liquid is approximately at the level controlled by the float means.

9. A float controlled feeding station for bees as in claim 5, further comprising float adjustment means to adjust the liquid control level.

10. A float controlled feeding station for bees as in claim 5, wherein the float means is pivoted upon a pivot rod located near one corner of the float means, and the pivot rod rests upon a pivot groove attached to the sides of the first chamber.

11. A float controlled feeding station for bees as in claim 10, wherein several pivot grooves are attached to the sides of the first chamber to permit adjustment of the float controlled liquid level.

12. A float controlled feeding station for bees as in claim 5, wherein the valve means is a stopper moved into place to close the opening of the connecting means when the float means rises.

13. A float controlled feeding station for bees as in claim 12, further comprising a conical shaped stopper to assure alignment of the stopper with the opening of the connecting means.

14. A float controlled feeding station for bees as in claim 5, wherein the valve means includes a positive opening action to prevent the valve means from sticking closed.

15. A float controlled feeding station for bees as in claim 5, wherein the second chamber has textured walls to provide traction for the bees.

16. A float controlled feeding station for bees as in claim 5, wherein the width of the feeding station is between 15/16 inch and 1¼ inch.

* * * * *